(12) United States Patent
Caviness

(10) Patent No.: US 8,296,992 B1
(45) Date of Patent: Oct. 30, 2012

(54) SALTWATER FLY FISHING SURF/JETTY STRIPPING BASKET

(76) Inventor: Blair H. Caviness, Falls Church, VA (US)

(*) Notice: Subject to any disclaimer, the term of this patent is extended or adjusted under 35 U.S.C. 154(b) by 0 days.

(21) Appl. No.: 13/437,734

(22) Filed: Apr. 2, 2012

(51) Int. Cl.
*A01K 97/06* (2006.01)
*A01K 97/00* (2006.01)

(52) U.S. Cl. .......... 43/54.1; 43/4; 206/315.11; 224/920; 141/331; 141/340; 210/483; 210/495; 210/497.01; 210/498; 248/94

(58) Field of Classification Search .................. 43/54.1, 43/4; 206/315.11; 224/920; 141/331, 334, 141/340; 210/483, 495, 497.01, 497.3, 498; 248/94
See application file for complete search history.

(56) References Cited

U.S. PATENT DOCUMENTS

| | | | | | |
|---|---|---|---|---|---|
| 559,905 | A | * | 5/1896 | Pike | 141/331 |
| 585,172 | A | * | 6/1897 | Ashbaugh et al. | 141/340 |
| 638,332 | A | * | 12/1899 | Hendricks | 224/674 |
| 744,060 | A | * | 11/1903 | Frye | 210/497.3 |
| 892,000 | A | * | 6/1908 | Mackaskie | 141/331 |
| 947,917 | A | * | 2/1910 | Kollenberg | 141/331 |
| 955,164 | A | * | 4/1910 | Husted | 224/191 |
| 1,053,749 | A | * | 2/1913 | Stebbins | 224/270 |
| 1,168,532 | A | * | 1/1916 | Meltz | 248/94 |
| 1,549,400 | A | * | 8/1925 | Wimler | 43/54.1 |
| 1,636,789 | A | * | 7/1927 | Sigley | 141/340 |
| 2,098,636 | A | * | 11/1937 | Smith et al. | 43/54.1 |
| 2,257,944 | A | * | 10/1941 | Fischbein | 210/497.3 |
| 2,502,816 | A | * | 4/1950 | Bennek | 43/4 |
| 2,531,551 | A | * | 11/1950 | Brecht et al. | 43/4 |
| 2,611,982 | A | * | 9/1952 | Sears | 43/4 |
| 2,670,557 | A | * | 3/1954 | Pachner | 43/4 |
| 2,795,335 | A | * | 6/1957 | Coen | 210/497.01 |
| 2,822,116 | A | * | 2/1958 | Smalley et al. | 224/575 |
| 2,850,220 | A | * | 9/1958 | Ehrler et al. | 43/54.1 |
| 2,883,783 | A | * | 4/1959 | Del Matter | 43/4 |
| 3,059,369 | A | * | 10/1962 | Swanson | 43/4 |
| 3,065,561 | A | * | 11/1962 | Swanson | 43/4 |
| 3,148,811 | A | * | 9/1964 | Foltz | 43/54.1 |
| 3,354,575 | A | * | 11/1967 | Darrow | 43/4 |
| D218,487 | S | * | 8/1970 | Flores | 141/331 |
| 3,541,722 | A | * | 11/1970 | Garrison | 43/4 |
| 3,691,666 | A | * | 9/1972 | Herdwig | 43/54.1 |
| 3,753,308 | A | * | 8/1973 | Swanson | 43/4 |
| 3,949,510 | A | * | 4/1976 | Johnson | 43/4 |
| 4,054,184 | A | * | 10/1977 | Marcinko | 141/340 |
| 4,273,166 | A | * | 6/1981 | Bradley | 141/340 |
| 4,290,221 | A | * | 9/1981 | Dotson, Sr. | 43/4 |
| 4,297,802 | A | * | 11/1981 | Normann | 43/4 |
| 4,323,181 | A | * | 4/1982 | Spasoff | 43/54.1 |
| 4,402,471 | A | * | 9/1983 | Normann | 43/4 |
| 4,600,125 | A | * | 7/1986 | Maynard, Jr. | 141/331 |
| 4,789,017 | A | * | 12/1988 | Panasewicz et al. | 248/94 |
| 4,836,428 | A | * | 6/1989 | Evans et al. | 224/673 |
| 5,182,877 | A | * | 2/1993 | Burchill et al. | 43/54.1 |
| 5,205,448 | A | * | 4/1993 | Kester et al. | 224/575 |
| D341,149 | S | * | 11/1993 | Pollak | 141/340 |
| 5,358,161 | A | * | 10/1994 | Perugini | 224/666 |
| 5,397,040 | A | * | 3/1995 | Lee | 206/315.11 |
| 5,402,835 | A | * | 4/1995 | Middleton | 141/331 |

(Continued)

*Primary Examiner* — Darren W Ark
(74) *Attorney, Agent, or Firm* — Henry J. Recla

(57) ABSTRACT

A stripping basket for use in fly fishing from surf or a jetty having a smooth interior surface free of protrusions and having a converging lower end and adapted to be mounted to one side of an angler below the waistline slightly tilted forward for facilitating line stripping and casting during use.

30 Claims, 4 Drawing Sheets

U.S. PATENT DOCUMENTS

| | | | |
|---|---|---|---|
| D361,201 S * | 8/1995 | Chaney et al. | D3/260 |
| 5,465,522 A * | 11/1995 | Varda | 43/4 |
| 5,511,595 A * | 4/1996 | Stidham | 141/331 |
| 5,542,204 A * | 8/1996 | Heaney | 43/4 |
| 5,549,227 A * | 8/1996 | Klotz | 43/54.1 |
| 5,628,141 A * | 5/1997 | Crawford | 43/54.1 |
| 5,775,023 A * | 7/1998 | Botkins | 43/4 |
| 5,979,516 A * | 11/1999 | Grant | 141/340 |
| 6,119,390 A * | 9/2000 | Dickie | 43/54.1 |
| 6,189,258 B1 * | 2/2001 | Anderson | 43/54.1 |
| 6,318,422 B2 * | 11/2001 | Woratyla et al. | 141/331 |
| 6,438,892 B1 * | 8/2002 | Oberman et al. | 43/4 |
| 6,450,219 B1 * | 9/2002 | Ingram | 141/331 |
| 6,598,334 B1 * | 7/2003 | Edevold | 43/4 |
| 6,625,921 B2 * | 9/2003 | Friederichs, III | 43/4 |
| 6,907,689 B2 * | 6/2005 | Pendzimas | 43/4 |
| 6,981,346 B1 * | 1/2006 | Wiezycki | 43/4 |
| 7,066,361 B1 * | 6/2006 | Williams | 224/920 |
| 7,140,148 B1 * | 11/2006 | Williams, II | 43/54.1 |
| 7,191,536 B1 * | 3/2007 | Bailey | 43/4 |
| 7,726,472 B1 * | 6/2010 | Duvuvuei | 206/315.11 |
| 7,900,392 B2 * | 3/2011 | Musto | 43/54.1 |
| 7,975,734 B2 * | 7/2011 | Makowiec et al. | 141/340 |
| D659,385 S * | 5/2012 | Campbell | D22/134 |
| 2002/0017049 A1 * | 2/2002 | Millett et al. | 43/11 |
| 2006/0108022 A1 * | 5/2006 | Carter et al. | 141/340 |
| 2006/0185222 A1 * | 8/2006 | Alvarez | 43/54.1 |
| 2007/0289199 A1 * | 12/2007 | Looney | 43/54.1 |
| 2011/0214782 A1 * | 9/2011 | McGeary | 141/331 |

* cited by examiner

SALTWATER FLY FISHING SURF/JETTY STRIPPING BASKET

TECHNICAL FIELD

This invention is designed to more specifically aid the Saltwater Fly fisherman who wants to fly fish the surf, or, fly fish from a jetty, and, needs guaranteed line control.

BACKGROUND

When fly fishing, most of the time, a small hook is used with some feathers or light synthetic hair tied on to the hook so that it resembles something a fish would want to eat when pulled back thru the water. This "fly" has no weight. In order to cast it, fly fishermen use a line that has weight. Once you get enough of this line outside the rod, it must be kept airborne by moving the rod back and forth and gradually letting out more line which is controlled by the fisherman. The line can travel 30 or 40 yards if the "cast" is executed by someone who knows what they are doing. This has also become a very popular way to go after saltwater fish like Striped Bass. Saltwater fly fishing has become quite popular. It is estimated that 5 million people saltwater fly fish.

When preparing to make a cast, it is necessary to pull enough of the line off of the real that is required to make the cast. A fly fishing reel is primarily used to store the fly fishing line when not casting except when a big enough fish is caught and drag, supplied by the reel, is necessary to bring the fish in. It is actually not used during the fly fishing maneuver, i.e., line stripping and casting. If you are standing in the surf, or on a rocky jetty, as in the case of ocean fly fishing, you have to have a dependable way to store and control the line. Jetties have many crevices that go down very far. There are crevices on top of crevices. If a fly line spills into these crevices, it very often snags on something once you try to retrieve it. You end up losing your very expensive fly line not to mention a lovely day of fishing. The same can also happen when fly fishing from a beach with the surf pounding. A lovely day of fishing can quickly go down hill when your fly line spills out into the surf.

One of the next innovations arriving now in salt water fly fishing are longer rods. When you combine these with longer, weight-forward, fly lines, you can make long casts. The longer the cast, the longer your fly is in the water, and the better one's chances are of hooking a fish. With a longer rod, the line can be held up above approaching waves. However, with longer rods and, consequently, longer lines, line control is even more important.

A saltwater fly fisherman who wants to fish the open ocean surf, or, from a rock jetty, is faced with two critical problem areas. In order to have any chance of success, he must keep his fly line out of the surf, or out of the rocky crevices of a jetty. If a fly line ends up in the surf, it will pick up sand and immediately begin pulling the rest of the line into the surf, ruining any chance of making a cast. A jetty is composed of large rocks piled on top of each other. If your line falls into these crevices, it will flow like a slinky back and forth into openings that are deeper and deeper. When one tries to retrieve the line, it usually binds in a crack. You have lost your expensive fly line, and unless you have another spool of line, you are finished fly fishing for the day. Also, in order to make a successful cast, once retrieved, the line must not get tangled. A stripping basket is a container designed to hold fly line when fly fishing and must keep the line from getting tangled, i.e., not enable the line to get tangled. Stripping baskets made of mesh or perforated sidewalls perform poorly in this aspect because the open sidewall construction allows wind penetration. Again, an important feature of successful fly fishing is line control which is just as important as a casting technique.

In order to be successful in the Surf, or from a jetty, a fly fisherman needs a well designed stripping basket. A variety of stripping baskets are available today, but all of them have shortcomings when it comes to the surf. Surf fishing in the ocean, which is full of Striped Bass, Bluefish, pounding schools of baitfish, and where the surrounding sky has flocks of wheeling, diving, or shrieking gulls, and where the waves are breaking against your legs, lends to quite a chaotic environment. One's eyes must be focused straight ahead seeing everything that is happening to make sure of the right timing and direction for casting a line. Line control is very important under these circumstances and must be performed in a systematic manner. The stripping basket plays an important part of line control. The basket must be located where you expect it to be. In order to retrieve the line in a systematic fashion, one must be able to go to a spot, such as the entrance of the stripping basket, time after time without looking. Such retrieval must be done by quick, coordinated and repetitive movements. Ocean fly fishing bears no resemblance to fly fishing from a boat, or on land where it is easy to drop the line on a deck or on the ground. In these instances, when retrieving the line, each strip of line falls on top of the others, thereby enabling the next cast. Normally, in this case, the line does not get tangled because of high winds or by a jostling container.

Saltwater fly fishing is much more demanding than freshwater fly fishing. In saltwater, one is after bigger, faster fish. The fly rod is generally larger. The reel is larger, and heavier, and the line you use is stronger. In general, the casts are longer. As soon as the line is cast, most often, an angler will retrieve the line as fast as possible. This involves bringing back the line in 2 to 3 foot long strips as quickly as possible. A stripping basket must accomplish two things. First, it must be able to hold the all of the line of a retrieved cast which can be up to 100' of line. Secondly, it must automatically organize the retrieved line in such a way that the next cast can be made without any fouling of the line.

One typical fly fishing basket in use today is disclosed in U.S. Pat. No. 7,900,392 to Musto which illustrates a folding fly fishing stripping basket attached to the waist of a user. Another typical fly fishing basket is disclosed in U.S. Pat. No. 5,182,877 to Burchill, et al. which illustrates a non-folding fly fishing stripping basket attached to the waist of a user. U.S. Pat. No. 6,189,258 to Anderson discloses a free standing fly fishing stripping container. U.S. Pat. No. 5,628,141 to Crawford discloses a fly fishing stripping basket attached to the waist of a user made of fabric or mesh material. U.S. Pat. No. 3,691,666 to Herdwig discloses a fish storing basket made from wicker material. Patent Application Publication No. US 20020017049 A1 to Millett, et al. discloses a multi-purpose fishing basket that serves as fish storage and as a "strip box".

Fly fishing in the surf is as much about line control as it is about being able to cast. Successful line control is what leads to a successful cast. None of the current designs are considered functional for fly fishing in the surf. They are either too shallow, tip the wrong way when worn, have too many obstructions or protrusions, or not made of windproof walls. Compared to the design of the present invention, all other designs have a relatively large floor that can allow the line to shift position during the retrieve. This increases the chance of tangling during the next cast. Thus, there is a need for an efficiently designed stripping basket for fly fishing in an ocean surface as will be described hereinafter.

BRIEF SUMMARY OF THE INVENTION

The stripping basket of the present invention is oblong and funnel shaped. The funnel shaped side walls of the basket force strips of line to the bottom of the basket wherein the narrowing walls hold the strips of line in place. As the line is retrieved, successive strips of line must pile on top of each other. As the angler proceeds through the next cast, the piled strips of line unfold flawlessly.

The stripping basket of the present invention is designed to have a container with a top opening large enough and a container deep enough to accommodate a retrieved casting line. A key innovation of the present invention which makes it unique and effective is the sloped interior walls which force the line to the bottom of the basket where it is constricted and held by the narrowing walls. This guarantees that successive strips of line land on top of each other setting up the next cast. The fly fishing basket of the present invention is designed to have smooth interior walls with a funneled shaped interior having no outstanding obstructions or protrusions that would cause the line to tangle during its retrieval and also provided with drainage ports at its lowermost end to permit any water collected therein to drain. The present invention is designed to be hung from either side of the waist of the fly fisherman such that the top opening is located in line with the natural swing of the fisherman's hand during a systematic, repetitive, retrieval of the casted line. Furthermore, the basket is provided with a belt attachment system that does not intrude with the top opening or the basket interior and holds the basket to either side of the angler below the waistline with the top opening tilted slightly forward. The fact that the basket is tilted slightly forward allows the fisherman's hand to enter the top opening with little or no interference from any of the sidewalls. A belt (not shown) usable with the present invention can be of the type made of wide, sturdy nylon having a lever operated-buckle that is widely available at most Dive shops.

DETAILED DESCRIPTION OF THE INVENTION

Figure 1:
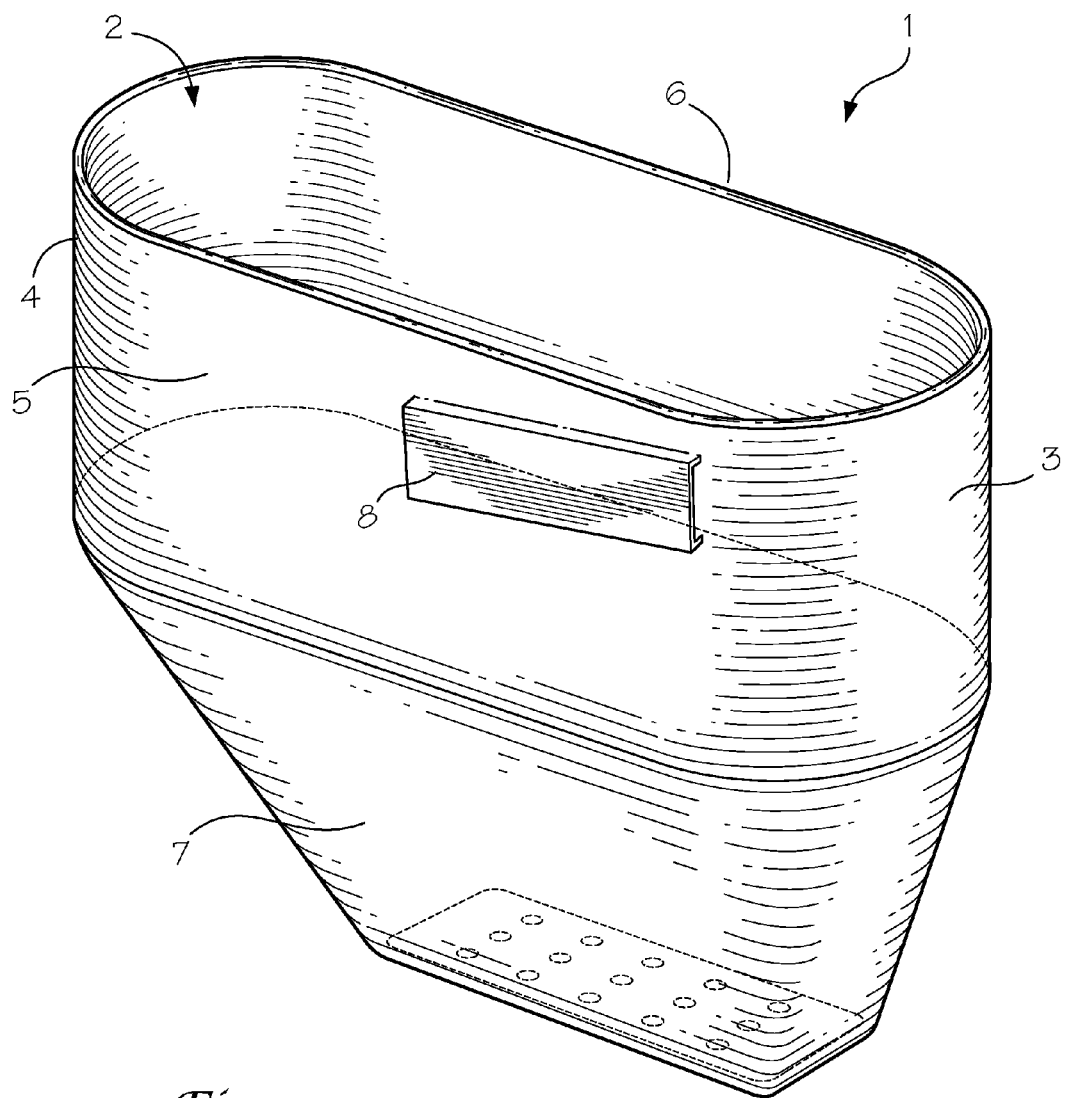
FIG. 1 is a side view of the present invention showing a sidewall adapted to be positioned against the side of a fisherman.

Referring to FIG. 1, a perspective view of the stripping basket (1) of the present invention is illustrated wherein the basket is designed to have a deep interior (2), with front wall (3), rear wall (4) and side walls (5) and (6). The bottom half (7) of the basket is funnel-shaped. On either sidewall (5) or (6), a belt attachment (8) or (8') is provided depending on whether the angler is left-handed or right-handed. The walls are made of waterproof material or plastic such as a thermoplastic, polyvinyl chloride (PVC) or any other appropriate material that has sufficient rigidity to maintain a free standing unit. The walls are preferably have a thickness of ⅛ of an inch, but may be varied between ⅛ and ¼ of an inch. Any conventional manufacturing technique may be employed to manufacture the present invention such as injection molding or pore molding. The unit is preferably injection molded as a one-piece unit, but may be molded in sections and subsequently assembled such as by heat fusion.

Figure 2:
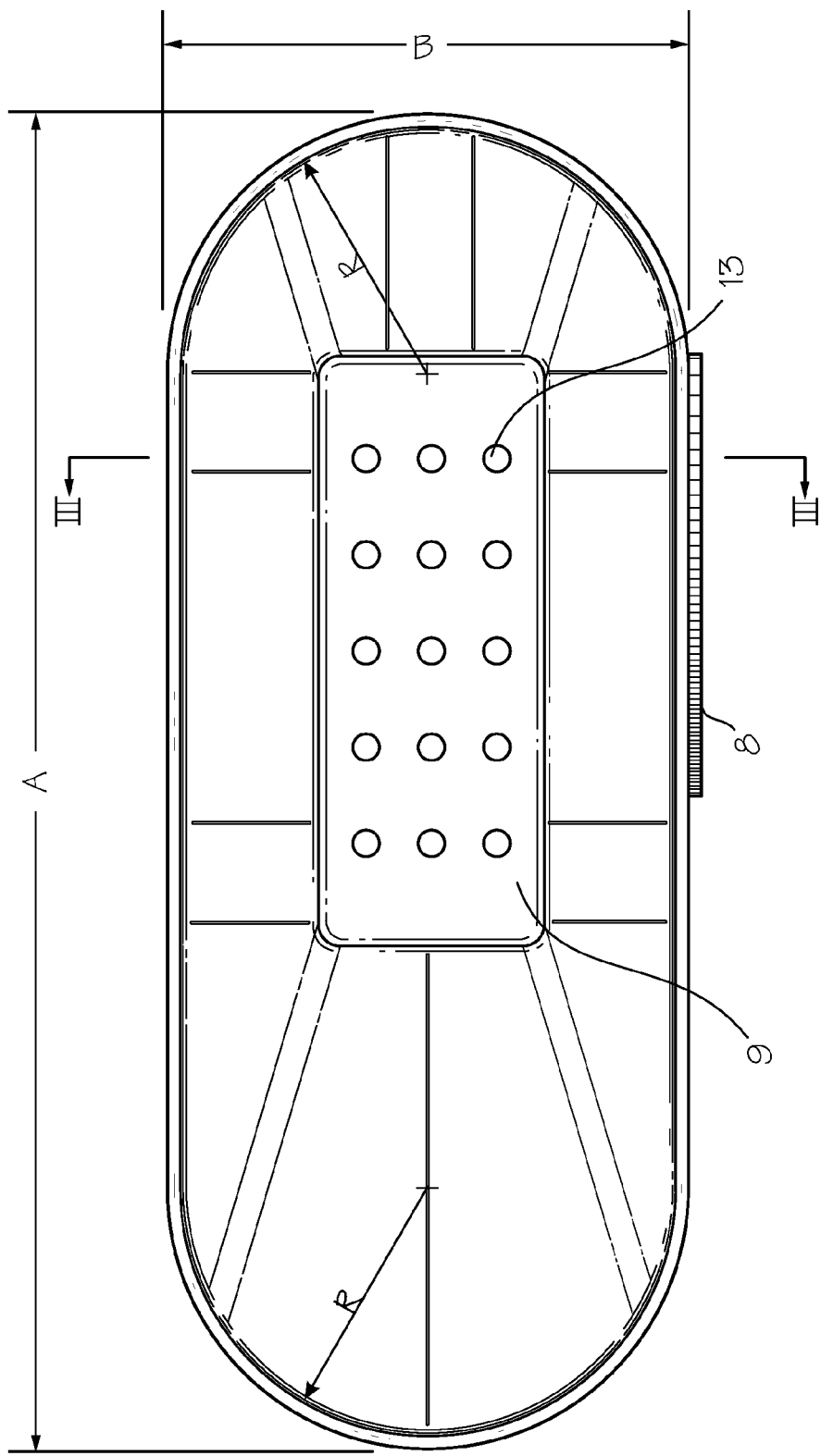
FIG. 2 is a top view of the present invention showing the open top, angled sidewalls and perforated floor.
Figure 3:
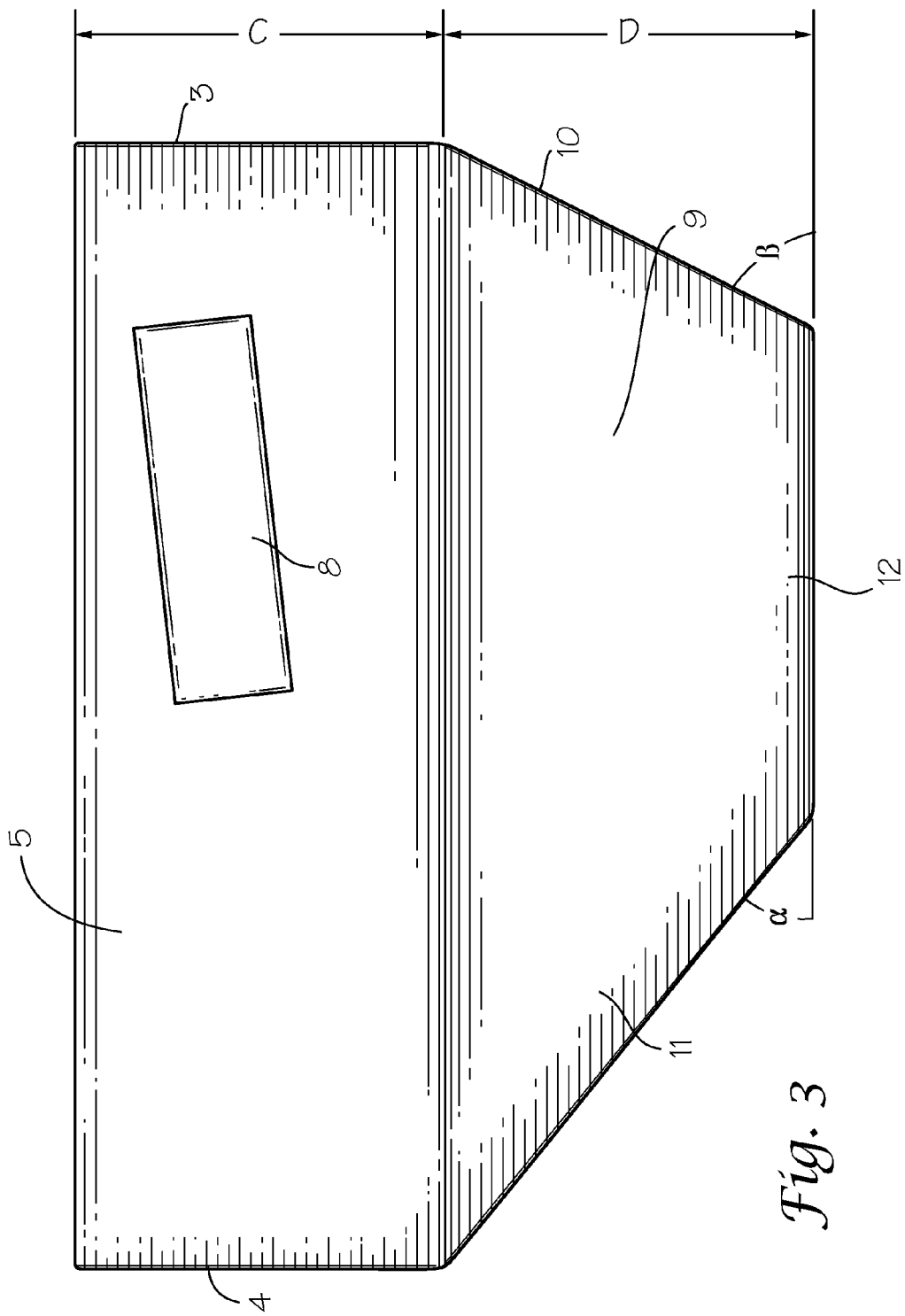
FIG. 3 is a sectional view of the present invention taken along lines III-III in FIG. 2.
Figure 4:
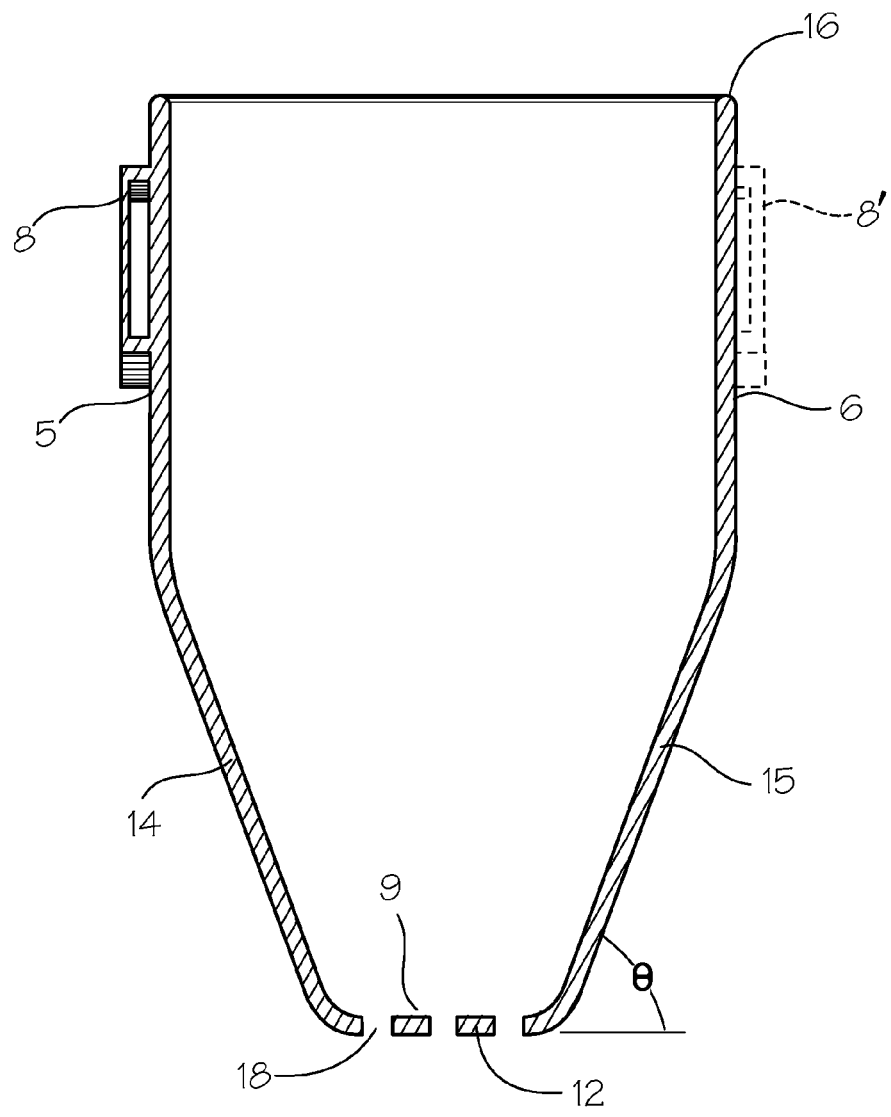
FIG. 4 is a perspective view of the present invention showing the belt attachment system and rounded corners.

Referring to FIGS. 2 and 3, top and side views of the present invention are illustrated, respectively. The basket has a preferable length A of approximately 18 inches which may be varied between 16 and 20 inches. The basket has a preferable width B of approximately 7 inches which may be varied between 6 and 8 inches. The front and rear walls are curved and may have a radius approximately between 3 and 4 inches with a preferable radius of approximately 3.5 inches, but also may have more or less curvature depending on the selected width, or may be more rectangular shaped with rounded corners. As shown in FIG. 3, the basket includes and upper section C and a lower section D. The upper section C has a preferred height of approximately 6 inches, but may be varied between 5 and 7 inches. The lower section D has a preferred height of approximately 6 inches, but may be varied between 5 and 7 inches. The front, rear and side walls of the upper section are substantially parallel to each other, but may have a slight inclination converging to the lower section. The walls (10), (11), (14) and (15) of the lower section define a funnel-shaped configuration as best seen in FIGS. 3 and 4. The front wall (10) of the lower section is inclined as indicated by angle $\beta$ which is preferably is approximately 65° but may be varied between 55° and 75°. The rear wall (11) of the lower section is inclined as indicated by angle $\alpha$ which preferably is approximately 40° but may be varied between 35° and 50°. As shown in FIG. 4, the side walls (14) and (15) of the lower section are inclined as indicated by angle $\theta$ which preferably is approximately 70° but may be varied between 60° and 80°. Each the walls of the lower section intersect with rounded corners.

Figure 5:
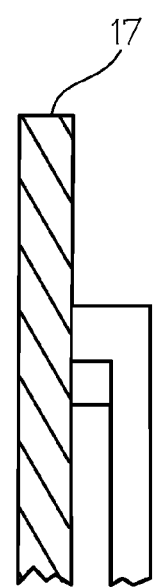
FIG. 5 is a sectional view of an alternative upper edge of the basket.

Referring again to FIGS. 2 and 4, the funnel-shaped lower section has floor (12) having interior surface (9). The floor (12) includes a series of drain ports (13) extending therethrough to allow any water that may spill into the basket to drain. The floor preferably is approximately 3'×8" but may vary in size depending on the angles of inclination of the sidewalls of the lower section. Also shown in FIG. 4, belt attachment (8) is preferably integrally molded with sidewall (5), but may be a separate piece attached thereto such as by heat fusion. The arrangement illustrated in FIG. 4 would be preferred by a right-handed angler with the basket located on the left side of the waistline. The belt attachment (8) is disposed on the sidewall (5) at a slight angle with respect to the top opening. This causes the basket, when worn by an angler, to tilt slightly forward to facilitate easy entry of the angler's hand into the basket during the repetitive movement of the angler's hand during the stripping procedure. Alternatively, a belt attachment (8') could be attached to the opposite sidewall (6) as shown in fathom lines. This arrangement would be preferred by a left-handed angler. Of course, the basket could be manufactured to have both belt attachments whereby the basket could be used by either a right-handed or left-handed angler. Furthermore, although the belt attachment is shown as a single loop member, the belt attachment could be multiple side-by-side loops. Also shown in FIG. 4, the basket terminates in an upper edge (16) which is a rounded surface not to interfere with the line stripping. Alternatively, the upper edge may be flat as illustrated in FIG. 5 as upper edge (17). The upper edge and bottom wall are substantially parallel to each other but may be angled with respect to each other. An important feature of the present invention is that the basket has smooth interior surfaces free of any obstructions or protrusions extending into the interior. This is an important feature so that the line will not be interfered with during the stripping and casting procedure.

The foregoing relates to the preferred exemplary embodiments of the invention, it being understood that other variants and embodiments thereof are possible within the spirit and scope of the invention, the latter being defined by the appended claims.

I claim:

1. A fly fishing stripping basket comprising,
an elongated substantially rigid monolithic container having an upper section and a lower section, said upper section having a height approximately equal to a height of said lower section;
said upper section having substantially rounded front and rear walls and substantially parallel side walls and an open top, wherein said open top comprises an upward extending upper edge defined by said front, rear and side walls of said upper section, said upper edge lying in a plane substantially perpendicular to said side walls of said upper section;
said side walls of said upper section being longer than said front and rear walls of said upper section;
said lower section having walls converging from said walls of said upper section;
said walls of said lower section converging to a lowermost portion having perforations therethrough for drainage of any fluids that may be present in said basket;
said walls of said upper and lower sections having smooth interior surfaces free of any protrusions; and
at least one belt attachment defining a passage therethrough along a central axis thereof, said at least one belt attachment disposed on one of said side walls of said upper section adjacent to said upper edge for receiving a belt to be worn around a waistline of a user; wherein said central axis of said at least one belt attachment is disposed at a slight angle with respect to said plane of said upper edge thereby causing said open top of said basket to tilt slightly forward when worn by an angler,
whereby said basket, in use, will hang below a waistline of an angler with a slightly forward tilt and facilitate line stripping and casting by the angler during fly fishing in surf or from a jetty without any interference.

2. A fly fishing stripping basket as claimed in claim 1, wherein said upper edge comprises a flat upper surface lying in said plane defining said open top.

3. A fly fishing stripping basket as claimed in claim 1, wherein said upper edge comprises a rounded upper surface having its apex lying in said plane defining said open top.

4. A fly fishing stripping basket as claimed in claim 1, wherein said walls have a thickness of between one-eighth to one-quarter inch.

5. A fly fishing stripping basket as claimed in claim 1, wherein said basket has a length between 16 and 20 inches, a width between 6 and 8 inches and a height between 10 and 14 inches.

6. A fly fishing stripping basket as claimed in claim 1, wherein said front and rear walls of said upper section have a radius of between 3 and 4 inches.

7. A fly fishing stripping basket as claimed in claim 1, wherein said front and rear walls of said upper section have a radius of approximately 3.5 inches.

8. A fly fishing stripping basket as claimed in claim 1, wherein said at least one belt attachment comprises an elongated loop extending along said upper edge.

9. A fly fishing stripping basket as claimed in claim 1, wherein said belt attachment is mounted onto said one of said side walls of said upper section.

10. A fly fishing stripping basket as claimed in claim 1, wherein said basket is molded as a monolithic unit.

11. A fly fishing stripping basket comprising,
a one-piece substantially rigid container having an upper section and a lower section, said upper section having a height approximately equal to a height of said lower section;
said upper section having substantially rounded front and rear walls and substantially parallel side walls and an open top, wherein said open top comprises an upward extending upper edge defined by said front, rear, and side walls and lying in a plane substantially perpendicular to said side walls of said upper section;
said lower section being funnel-shaped having front, rear and side walls converging from said upper section;
said rear wall of said lower section having a greater inclination than said front wall of said lower section;
said side walls of said lower section having lower ends converging into a flat bottom wall having perforations therethrough for drainage of any fluids that may be present in said basket;
said walls of said upper and lower sections and said bottom wall having smooth interior surfaces free of any protrusions; and
at least one belt attachment defining a passage therethrough along a central axis thereof, said at least one belt attachment disposed on one of said side walls of said upper section adjacent to said upper edge for receiving a belt to be worn around a waistline of a user; wherein said central axis of said at least one belt attachment is disposed at a slight angle with respect to said plane of said upper edge thereby causing said open top of said basket to tilt slightly forward when worn by an angler,
whereby said basket, in use, will hang below a waistline of an angler with a slightly forward tilt and facilitate line stripping and casting by the angler during fly fishing in surf or from a jetty without any interference.

12. A fly fishing stripping basket as claimed in claim 11, wherein said upper edge comprises a flat upper surface lying in said plane defining said open top.

13. A fly fishing stripping basket as claimed in claim 11, wherein said upper edge comprises a rounded upper surface having its apex lying in said plane defining said open top.

14. A fly fishing stripping basket as claimed in claim 11, wherein said walls have a thickness of between one-eighth to one-quarter inch.

15. A fly fishing stripping basket as claimed in claim 11, wherein said lower section front, rear and side walls intersecting each other with rounded corners.

16. A fly fishing stripping basket as claimed in claim 11, wherein said basket has a length between 16 and 20 inches, a width between 6 and 8 inches and a height between 10 and 14 inches.

17. A fly fishing stripping basket as claimed in claim 11, wherein said rear wall of said lower section has an inclination of between 35 and 50 degrees with respect to said bottom wall, said front wall of said lower section has an inclination of between 55 and 75 degrees with respect to said bottom wall, and said side walls of said lower section have an inclination of between 60 and 80 degrees with respect to said bottom wall.

18. A fly fishing stripping basket as claimed in claim 11, wherein said rear wall of said lower section has an inclination of 40 degrees with respect to said bottom wall, said front wall of said lower section has an inclination of 65 degrees with respect to said bottom wall, and said side walls of said lower section have an inclination of 70 degrees with respect to said bottom wall.

19. A fly fishing stripping basket as claimed in claim 11, wherein said bottom wall and said plane of said upper edge of said open top are substantially parallel.

20. A fly fishing stripping basket as claimed in claim 11, wherein said front and rear walls of said upper section have a radius of between 3 and 4 inches.

21. A fly fishing stripping basket as claimed in claim 11, wherein said front and rear walls of said upper section have a radius of approximately 3.5 inches.

22. A fly fishing stripping basket as claimed in claim 11, wherein said at least one belt attachment comprises an elongated loop extending along said upper edge.

23. A fly fishing stripping basket as claimed in claim 11, wherein said at least one belt attachment is mounted onto said one of said side walls of said upper section.

24. A fly fishing stripping basket as claimed in claim 11, wherein said basket is molded as a one-piece unit.

25. A fly fishing stripping basket comprising,
   a one-piece substantially rigid container having an upper section and a lower section, said upper section having a height approximately equal to a height of said lower section;
   said upper section having substantially rounded front and rear walls and substantially parallel side walls and an open top, wherein said open top comprises an upward extending upper edge defined by said front, rear and side walls and lying in a plane substantially perpendicular to said side walls of said upper section;
   said lower section being funnel-shaped having front, rear and side walls converging from said upper section;
   said rear wall of said lower section having a greater inclination than said front wall of said lower section;
   said side walls of said lower section having lower ends converging into a flat bottom wall having perforations therethrough for drainage of any fluids that may be present in said basket;
   said walls of said upper and lower sections and said bottom wall having smooth interior surfaces free of any protrusions;
   at least one belt attachment defining a passage therethrough along a central axis thereof, said at least one belt attachment disposed on one of said side walls of said upper section adjacent to said upper edge for receiving a belt to be worn around a waistline of a user, wherein said central axis of said at least one belt attachment is disposed at a slight angle with respect to said plane of said upper edge thereby causing said open top of said basket to tilt slightly forward when worn by an angler,
   said basket has a length between 16 and 20 inches, a width between 6 and 8 inches and a height between 10 and 14 inches; and
   said rear wall of said lower section has an inclination of between 35 and 50 degrees with respect to said bottom wall, said front wall of said lower section has an inclination of between 55 and 75 degrees with respect to said bottom wall, and said side walls of said lower section have an inclination of between 60 and 80 degrees with respect to said bottom wall;
   whereby said basket in use, will hang below a waistline of an angler with a slightly forward tilt and facilitate line stripping and casting by the angler during fly fishing in surf or from a jetty without any interference.

26. A fly fishing stripping basket as claimed in claim 25, wherein said at least one belt attachment is mounted onto said one of said side walls of said upper section.

27. A fly fishing stripping basket as claimed in claim 25, wherein said basket is molded as a one-piece unit.

28. A fly fishing stripping basket as claimed in claim 25, wherein said upper edge comprises a flat upper surface lying in said plane defining said open top.

29. A fly fishing basket as claimed in claim 25, wherein said upper edge comprises a rounded upper surface having its apex lying in said plane defining said open top.

30. A fly fishing stripping basket as claimed in claim 25, wherein said walls have a thickness of between one-eighth to one-quarter inch.

\* \* \* \* \*